(12) United States Patent
Zhang et al.

(10) Patent No.: US 11,526,376 B2
(45) Date of Patent: Dec. 13, 2022

(54) METHOD, ELECTRONIC DEVICE AND COMPUTER PROGRAM PRODUCT FOR RUNNING APPLICATION

(71) Applicant: EMC IP Holding Company LLC, Hopkinton, MA (US)

(72) Inventors: Yuting Zhang, Chengdu (CN); Kaikai Jia, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 312 days.

(21) Appl. No.: 16/888,827

(22) Filed: May 31, 2020

(65) Prior Publication Data

US 2021/0247998 A1 Aug. 12, 2021

(30) Foreign Application Priority Data

Feb. 7, 2020 (CN) .......................... 202010082378.6

(51) Int. Cl.
*G06F 9/455* (2018.01)
*G06F 9/48* (2006.01)
*G06N 3/04* (2006.01)

(52) U.S. Cl.
CPC ........ *G06F 9/4812* (2013.01); *G06F 9/45558* (2013.01); *G06N 3/0427* (2013.01); *G06N 3/0445* (2013.01); *G06F 2009/45575* (2013.01)

(58) Field of Classification Search
CPC . G06F 9/4812; G06F 9/45558; G06N 3/0427; G06N 3/0445
See application file for complete search history.

(56) References Cited

U.S. PATENT DOCUMENTS

| | | | | |
|---|---|---|---|---|
| 10,713,072 | B1* | 7/2020 | Burgin | G06Q 10/06315 |
| 11,210,133 | B1* | 12/2021 | Barker, Jr. | G06F 9/4862 |
| 2019/0213099 | A1* | 7/2019 | Schmidt | G06F 11/3006 |

OTHER PUBLICATIONS

"Technical Overview & How It Works, The Definitive Guide to Rubrik Cloud Data Management", vol. 1, Rubrik, Nov. 2019, (38 pages).

* cited by examiner

*Primary Examiner* — Tammy E Lee
(74) *Attorney, Agent, or Firm* — Chamberlain, Hrdlicka, White, Williams & Aughtry

(57) ABSTRACT

Embodiments of the present disclosure relate to a method for running an application, an electronic device, and a computer program product. The method includes determining, based on historical data associated with running of the application, a target time period and a computing resource to be used for running the application within the target time period, a load rate associated with the computing resource being higher than a threshold load rate in the target time period. The method further includes determining an interruption tolerance of the application based on a type of the application, determining costs for running the application by a plurality of types of virtual machines and determining a target type from the plurality of types based on the costs and the computing resource, to cause the application to be run by a virtual machine of the target type.

14 Claims, 5 Drawing Sheets

200 ⤵

```
┌─────────────────────────────────────────────────────────────┐
│                          ─ 202                              │
│ Determining, based on historical data associated with running of an application, │
│   a target time period and a computing resource to be used for running           │
│                the application within the target time period                     │
└─────────────────────────────────────────────────────────────┘
                              │
                              ▼
┌─────────────────────────────────────────────────────────────┐
│                          ─ 204                              │
│        Determining an interruption tolerance of the application based            │
│                        on a type of the application                              │
└─────────────────────────────────────────────────────────────┘
                              │
                              ▼
┌─────────────────────────────────────────────────────────────┐
│                          ─ 206                              │
│  Determining costs for running the application deleted by a plurality of         │
│   types of virtual machines based on a length of the target time period          │
│                     and the interruption tolerance                               │
└─────────────────────────────────────────────────────────────┘
                              │
                              ▼
┌─────────────────────────────────────────────────────────────┐
│                          ─ 208                              │
│       Determining a target type from the plurality of types based                │
│                  on the costs and the computing resource                         │
└─────────────────────────────────────────────────────────────┘
```

FIG. 2

METHOD, ELECTRONIC DEVICE AND COMPUTER PROGRAM PRODUCT FOR RUNNING APPLICATION

CROSS-REFERENCE TO RELATED APPLICATIONS

This application claims priority to Chinese Patent Application No. 202010082378.6 filed on Feb. 7, 2020. Chinese Patent Application No. 202010082378.6 is hereby incorporated by reference in its entirety.

TECHNICAL FIELD

Embodiments of the present disclosure relate to the field of data storage, and more particularly to a method for running an application, an electronic device, and a computer program product.

BACKGROUND

With the development of computer technologies, increasingly more software has become ever complex. To facilitate running of the software, technical staff implement such software as a plurality of microservices. Then, the plurality of microservices processes different tasks respectively to achieve the overall functionality. For example, in the field of data storage, a data protection system can now be implemented by a plurality of microservices.

In addition, with the development of cloud technologies, there are more and more cloud service platforms. As cloud platform resource costs are relatively low, many application software are deployed on cloud platforms. For example, microservices of the data protection system may also be arranged to run on the cloud platforms. However, running microservices on the cloud platforms still has many problems to be solved.

SUMMARY OF THE INVENTION

Embodiments of the present disclosure provide a method for running an application, a device, and a computer program product.

According to a first aspect of the present disclosure, a method for running an application is provided. The method includes determining, based on historical data associated with running of the application, a target time period and a computing resource to be used for running the application within the target time period, a load rate associated with the computing resource being higher than a threshold load rate in the target time period. The method further includes determining an interruption tolerance of the application based on a type of the application, the interruption tolerance indicating an interrupt rate supporting running of the application. The method further includes determining costs for running the application by a plurality of types of virtual machines based on a length of the target time period and the interruption tolerance. The method further includes determining a target type from the plurality of types based on the costs and the computing resource, to cause the application to be run by a virtual machine of the target type.

According to a second aspect of the present disclosure, an electronic device is provided. The electronic device includes a processor; and a memory storing computer program instructions, the processor running the computer program instructions in the memory and controlling the electronic device to execute actions, the actions including: determining, based on historical data associated with running of the application, a target time period and a computing resource to be used for running the application within the target time period, a load rate associated with the computing resource being higher than a threshold load rate in the target time period; determining an interruption tolerance of the application based on a type of the application, the interruption tolerance indicating an interrupt rate supporting running of the application; determining costs for running the application by a plurality of types of virtual machines based on a length of the target time period and the interruption tolerance; and determining a target type from the plurality of types based on the costs and the computing resource, to cause the application to be run by a virtual machine of the target type.

According to a third aspect of the present disclosure, a computer program product is provided. The computer program product is tangibly stored in a non-transitory computer-readable medium and includes machine-executable instructions. The machine-executable instructions, when being executed, cause a machine to execute steps of the method according to the first aspect of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

FIG. 2 illustrates a flowchart of method 200 for running an application according to an embodiment of the present disclosure;

The same or corresponding reference numerals in the accompanying drawings represent the same or corresponding components.

DETAILED DESCRIPTION OF THE EMBODIMENTS

Figure 1:
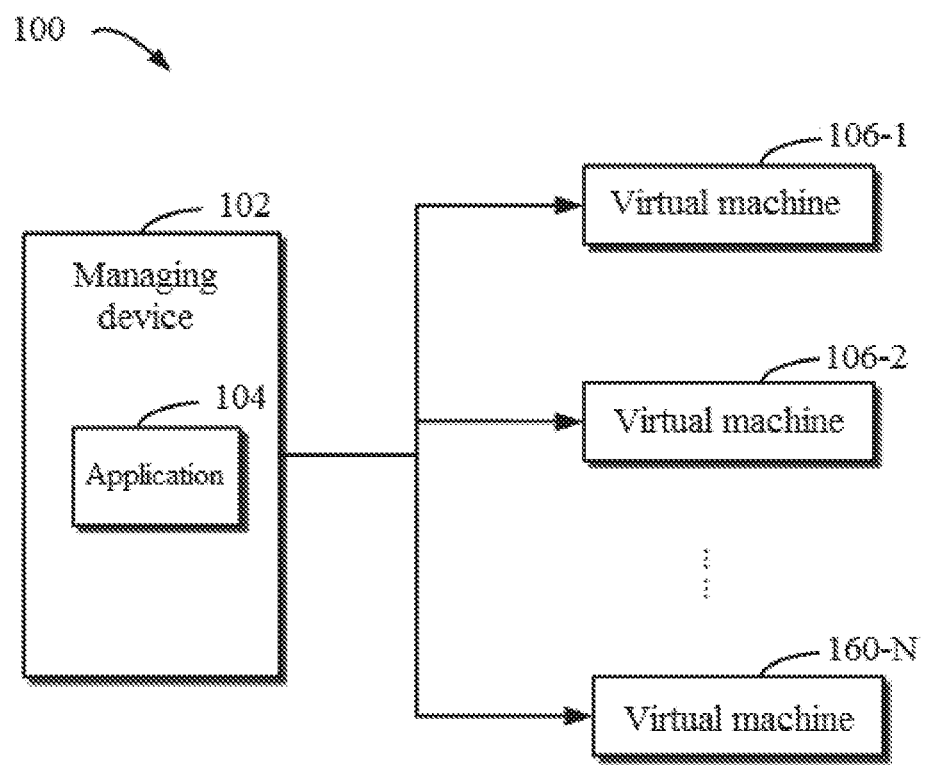
FIG. 1 illustrates a schematic diagram of example environment 100 in which a device and/or a method of embodiments of the present disclosure may be implemented.

Embodiments of the present disclosure will be described in more detail below with reference to the accompanying drawings. While some embodiments of the present disclosure are shown in the accompanying drawings, it should be understood that the present disclosure may be implemented in various forms and should not be construed as being limited to the embodiments set forth herein. In contrast, these embodiments are provided to make the present disclosure more thorough and complete. It should be understood that the accompanying drawings and the embodiments of the present disclosure are merely examples for illustrative purposes, and are not intended to limit the scope of protection of the present disclosure.

In the description of the embodiments of the present disclosure, the term "including" and similar wordings thereof should be construed as open-ended inclusion, i.e., "including, but not limited to." The term "based on" should be construed as "based at least in part on." The term "an embodiment" or "the embodiment" should be construed as "at least one embodiment." The terms "first," "second," and the like may refer to different or identical objects. Other explicit and implicit definitions may be further included below.

The principles of the present disclosure will be described below with reference to some example embodiments shown in the accompanying drawings. While preferred embodiments of the present disclosure are shown in the accompanying drawings, it should be understood that these embodiments are described merely to enable those skilled in the art to better understand and then implement the present disclosure, and are not intended to impose any limitation on the scope of the present disclosure.

Generally, services of data protection software may be implemented using a virtual machine for executing a task in a cloud platform on-demand, such as an on-demand instance. With the growth of service demands, more backup software needs to be deployed. However, such a virtual machine acquired on-demand needs to be implemented by manual deployment, and cannot automatically extend economically and efficiently.

Furthermore, a virtual machine deployed on-demand is generally used for data protection software in cloud. However, the cost for using the virtual machine in this manner is relatively high, such that customers need to pay attention to the impact of the total cost of such a virtual machine, e.g., the total cost of ownership (TCO). Furthermore, a user may have cloud resources from different cloud providers. However, because there is no global resource optimization scheme involving a plurality of clouds, a user cannot make the best use of resources in the plurality of clouds.

To solve one or more of the above problems, the present disclosure presents a method for running an application. In this method, first, a target time period and a computing resource to be used for running the application within the target time period are determined based on historical data associated with running of the application. Then, an interruption tolerance of the application is determined based on a type of the application. Costs for running the application by a plurality of types of virtual machines is determined based on a length of the target time period and the interruption tolerance. Finally, a target type is determined from the plurality of types based on the costs and the computing resource, to cause the application to be run by a virtual machine of the target type. With this method, the most appropriate virtual machine can be automatically selected from at least one cloud platform to run the application, thereby achieving an automatic extension of cross-cloud platform virtual machines, and improving the resource utilization and the data processing efficiency.

FIG. 1 below illustrates a schematic diagram of example environment 100 in which a device and/or a method of embodiments of the present disclosure may be implemented.

As shown in FIG. 1, example environment 100 includes managing device 102. Managing device 102 manages running of application 104, and determines, for application 104, e.g., a microservice, a type of virtual machine that can be used for running application 104. Managing device 102 shown in FIG. 1 is merely an example, rather than specifically limiting the present disclosure. In some embodiments, functions of managing device 102 may be distributed on a plurality of computing devices or a plurality of different virtual machines of a cloud platform.

Managing device 102 includes, but is not limited to, personal computers, server computers, handheld or laptop devices, mobile devices, such as mobile phones, personal digital assistants (PDAs), or media players, multiprocessor systems, consumer electronics, minicomputers, mainframe computers, distributed computing environments including any one of the above systems or devices, and the like.

When managing application 104, managing device 102 determines, based on historical data associated with application 104, a time period in which a load rate of a computing resource running application 104 is above a threshold load rate, and the computing resource to be used by application 104.

In some embodiments, the historical data associated with application 104 is usage data of the computing resource running application 104 within a preset historical time period, e.g., a usage rate of a processor, a usage rate of a memory, or a number of employed disk I/Os within the preset historical time period. The above examples are merely used for describing the present disclosure, rather than specifically limiting the present disclosure. Those skilled in the art may set the historical data associated with application 104 as required.

Generally, there is a virtual machine running at cost on a cloud platform, such as a spot instance. The virtual machine has interrupts in a running process, and a size of its interrupt rate is related to a user cost. When application 104 is running using this type of virtual machine on the cloud platform, it is necessary to determine an interruption tolerance of application 104. The interruption tolerance is an acceptable interrupt rate of application 104, which can ensure running of application 104. The interrupt rate is a ratio of the number of times of interrupting the application to the number of times of executing the application within a preset time period. Because different applications execute different tasks, the applications will require different interruption tolerances. For example, an application executing a data backup task may have 20% interruption tolerance; and an application executing hash search may have 100% interruption tolerance. The above examples are merely used for describing the present disclosure, rather than specifically limiting the present disclosure. Those skilled in the art may set an interruption tolerance corresponding to the application as required.

To run application 104, managing device 102 further needs to obtain a type or a name of application 104. Then, managing device 102 determines the interruption tolerance for application 104 based on the type or the name of application 104.

In an embodiment, managing device 102 stores different application types and corresponding interruption tolerances thereof, for example, storing in a list of relationships between the application types and the interruption tolerances. In some embodiments, managing device 102 may obtain corresponding relationships between various applications and corresponding interruption tolerances thereof from a user or other device.

After determining a length of a target time period and the interruption tolerance corresponding to application 104, managing device 102 may determine a cost of a virtual machine of each virtual machine type among a plurality of virtual machine types of at least one cloud platform based on the length of the target time period and the interruption tolerance. For example, a first cloud platform has two virtual machine types, such as virtual machine type 1 and virtual machine type 2, while a second cloud platform has one virtual machine type, such as virtual machine type 3. Virtual machine type 1 indicates a virtual machine having 2 cores and a 4G memory; virtual machine type 2 indicates a virtual machine having 4 cores and an 8G memory; and virtual machine type 3 refers to a virtual machine having 1 core and a 2G memory. Because different resources on each cloud platform have different costs, the costs that can satisfy the interruption tolerance of application 104 are different when virtual machines corresponding to the three virtual machine types run application 104 for the length of the target time period.

Managing device 102 can determine a to-be-used target type based on the costs corresponding to different virtual machine types. Alternatively or additionally, managing device 102 determines the target type further based on a delay between a client terminal interacting with application 104 and a virtual machine. After determining the virtual machine type, and after determining the number of to-be-used virtual machines, a request may be sent to a cloud platform where the determined target type is to start virtual machines 106-1, 106-2, . . . , 106-N (N is a positive integer) for running application 104. For the ease of description, the virtual machines are collectively referred to as virtual machine 106.

In some embodiments, application 104 is a microservice, such as a data backup service, a hash search services, or a garbage collection service in a data protection system. In some embodiments, application 104 is the data protection system. The above examples are merely used for describing the present disclosure, rather than specifically limiting the present disclosure. Those skilled in the art may set application 104 as any appropriate program as required.

A schematic diagram of environment 100 in which a device and/or a method of embodiments of the present disclosure may be implemented is described above in combination with FIG. 1. Method 200 for running an application according to an embodiment of the present disclosure will be described below in combination with FIG. 2, where method 200 may be executed at managing device 102 in FIG. 1 or any other appropriate device.

In block 202, managing device 102 determines, based on historical data associated with running of application 104, a target time period and a computing resource to be used for running application 104 within the target time period, a load rate associated with the computing resource being higher than a threshold load rate in the target time period. Managing device 102 first acquires the historical data, and then determines the target time period and the computing resource based on the historical data.

In some embodiments, the historical data are usage data of the computing resource running application 104 within a preset historical time period, e.g., a usage rate of a processor, a usage rate of a memory, or a number of employed disk I/Os within the preset historical time period.

In some embodiments, the load rate is a load rate of the processor. In some embodiments, the load rate is a load rate of a disk I/O. The above examples are merely used for describing the present disclosure, rather than specifically limiting the present disclosure. Those skilled in the art may set the load rate as a load rate of any appropriate resource as required.

In some embodiments, managing device 102 applies the historical data to a resource prediction model, to determine the target time period and the computing resource. In some embodiments, the resource prediction model is a recurrent neural network model. Alternatively or additionally, the recurrent neural network model is a long short-term memory (LSTM) neural network model.

In some embodiments, the resource prediction model predicts a time period in which the load rate of the computing resource is higher than the threshold load rate after a current moment and the computing resource based on historical data within a time period of a predetermined length. Alternatively or additionally, the time period of the predetermined length is a sliding time window. For example, the sliding time window is 20 days before the current moment, and then when performing prediction at a next moment, the historical data is historical data in 20 days from the next moment. The resource prediction model is obtained by training based on the historical data associated with running of application 104 and a target time period given in advance.

In some embodiments, the computing resource is a computing resource to be added for running application 104. The resource prediction model can determine an amount of the load rate exceeding the threshold load rate within the target time period. Managing device 102 can determine a computing resource required by a load corresponding to the amount of the excess load rate. For example, when running application 104, managing device 102 predicts, by computing, that a load rate of a CPU exceeds the threshold load rate of current managing device 102 by a half of the threshold load rate within a time period after the current moment. For example, a predicted load rate is 90%, the threshold load rate is 60%, and then an excess load rate is half of the threshold load rate. When a processor of current managing device 102 has 8 cores, a virtual machine that can implement a 4-core processor is at least further needed to process excess load. In some embodiments, the computing resource is all resources required to run application 104. The above examples are merely used for describing the present disclosure, rather than specifically limiting the present disclosure.

In block 204, managing device 102 determines an interruption tolerance of application 104 based on a type of application 104, the interruption tolerance indicating an interrupt rate supporting running of application 104.

Virtual machines on a cloud platform have different interrupt rates based on different costs, such as a spot instance. Depending on different application types or executed actions, each application type has different interruption tolerances. The interruption tolerance is a maximum interrupt rate that can guarantee regular running of that type of application.

In some embodiments, managing device 102 acquires a preset corresponding relationship between the application type and the interruption tolerance, such as a list of corresponding relationships between the application types/names and the interruption tolerances. Then, managing device 102 determines the interruption tolerance corresponding to the type of application 104 based on this corresponding relationship.

In block 206, managing device 102 determines costs for running application 104 by a plurality of types of virtual machines based on a length of the target time period and the interruption tolerance. The plurality of types of virtual machines are virtual machines from at least one cloud platform. To determine which type of virtual machine can be used for running application 104, it is necessary to determine a use cost of each type of virtual machine. A process of determining the cost is described in detail below in combination with FIG. 3.

In block 208, managing device 102 determines a target type from the plurality of types based on the costs and the computing resource, to cause application 104 to be run by a virtual machine of the target type. After determining the target type, managing device 102 sends a request to a cloud platform where the target type is, to generate a virtual machine corresponding to the target type.

In some embodiments, managing device 102 determines the target type based on the determined cost and computing resource. Each type has resource information corresponding to this type. For example, a virtual machine type indicates a virtual machine having 2 cores. Managing device 102 can determine a number of required virtual machines of each type based on the computing resource. For example, a computing resource of 4 cores is required, and therefore, the number of required virtual machines of this type is 2. Therefore, based on the number of virtual machines required for each type and a cost for each type, a total cost associated with this type is determined. Then, a type with a minimum total cost is selected as the target type based on the total cost of each type.

In some embodiments, managing device 102 further needs to determine a position of a client terminal interacting with application 104. Then, based on the position, managing device 102 determines a group of delays between the client terminal and the plurality of types of virtual machines. In this process, managing device 102 will determine a delay between the client terminal and each type of virtual machine. Managing device 102 determines the target type from the plurality of types based on the costs, the computing resource, and the group of delays.

In a process of determining the target type based on the costs, the computing resource, and the group of delays, managing device 102 can determine the number of required virtual machines of each type based on the computing resource. Based on the number of virtual machines required for each type and cost for each type, managing device 102 determines the total cost associated with this type. Then, managing device 102 computes an average value of the total cost and a corresponding delay, and then selects the target type based on the average value. In some embodiments, the average value is a harmonic average of the total cost and the delay. Alternatively or additionally, different weights may be set for the total cost and the delay. The above examples are merely used for describing the present disclosure, rather than specifically limiting the present disclosure.

With the above method, the most appropriate virtual machine can be automatically selected from at least one cloud platform to run the application, thereby achieving the automatic extension of virtual machines, and improving the resource utilization and the data processing efficiency.

Figure 3:
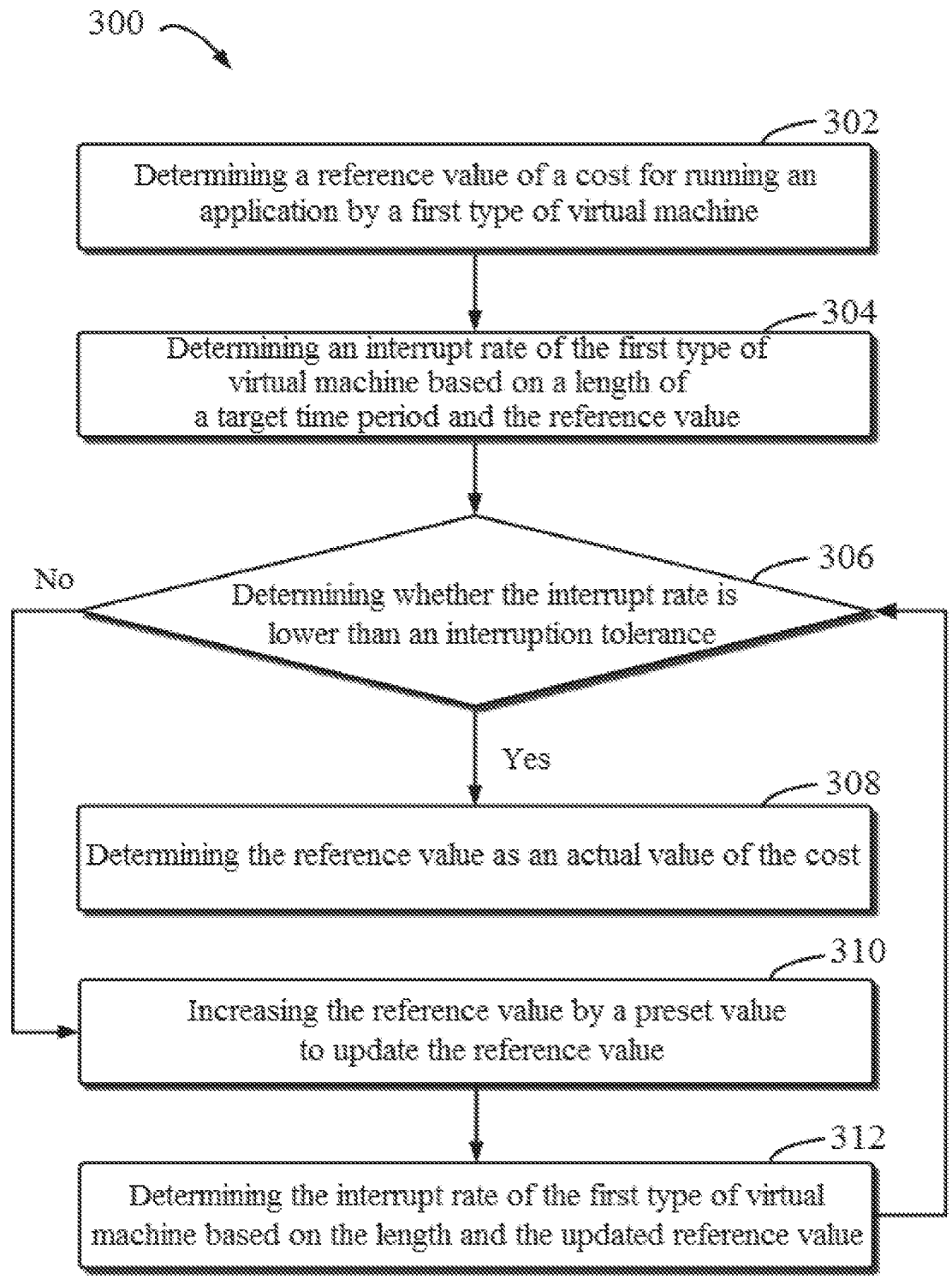
FIG. 3 illustrates a flowchart of method 300 for determining a cost according to an embodiment of the present disclosure.

The above FIG. 2 illustrates a schematic diagram of method 200 for running an application according to an embodiment of the present disclosure. An operation for determining a cost in block 206 of FIG. 2 will be described below in combination with FIG. 3. FIG. 3 illustrates a flowchart of method 300 for determining a cost according to an embodiment of the present disclosure. Method 300 in FIG. 3 may be implemented by managing device 102 in FIG. 1 or any other appropriate device.

In block 302, managing device 102 determines a reference value of a cost for running application 104 by a first type of virtual machine, the first type being one of a plurality of types. The plurality of types are types of virtual machines on at least one cloud platform connected with managing device 102. In some embodiments, a cloud platform may provide managing device 102 with information of the types of virtual machines on the cloud platform. In some embodiments, managing device 102 may request types of virtual machines on the cloud platform from the cloud platform.

In block 304, managing device 102 determines an interrupt rate of the first type of virtual machine based on a length of a target time period and the reference value. In some embodiments, managing device 102 predicts the interrupt rate of the first type of virtual machine through a neural network model. Alternatively or additionally, the neural network model is a recurrent neural network model, e.g., a LSTM neural network. After inputting historical cost information corresponding to the first type of virtual machine, the length of the target time period, and the reference value into the neural network model, the corresponding interrupt rate will be obtained.

In block 306, managing device 102 determines whether the interrupt rate is lower than an interruption tolerance. When determining that the interrupt rate is lower than the interruption tolerance, in block 308, managing device 102 determines the reference value as an actual value of the cost. In this case, the actual value is a cost for running the program by the first type of virtual machine.

In response to the interrupt rate being higher than or equal to the interruption tolerance, in block 310, managing device 102 increases the reference value by a preset value to update the reference value. The interrupt rate is relatively high, indicating that the interrupt rate of this type of virtual machine corresponding to the current reference value does not meet requirements. Thus, the reference value is increased. In some embodiments, the reference value is incremented by the preset value. In some embodiments, the reference value is increased by a user-specified amount. The above examples are merely used for describing the present disclosure, rather than specifically limiting the present disclosure. Those skilled in the art may increase the reference value by any appropriate amount as required.

In block 312, managing device 102 determines the interrupt rate of the first type of virtual machine again with the neural network model based on the length and the updated reference value, and then returns to block 306 to further determine whether the interrupt rate is lower than the interruption tolerance.

With the above method, the actual value of the cost corresponding to the first type of virtual machine can be quickly determined based on the length of the target time period and the reference value, thereby increasing the speed of determining the actual value of the cost and the data processing efficiency.

Figure 4:
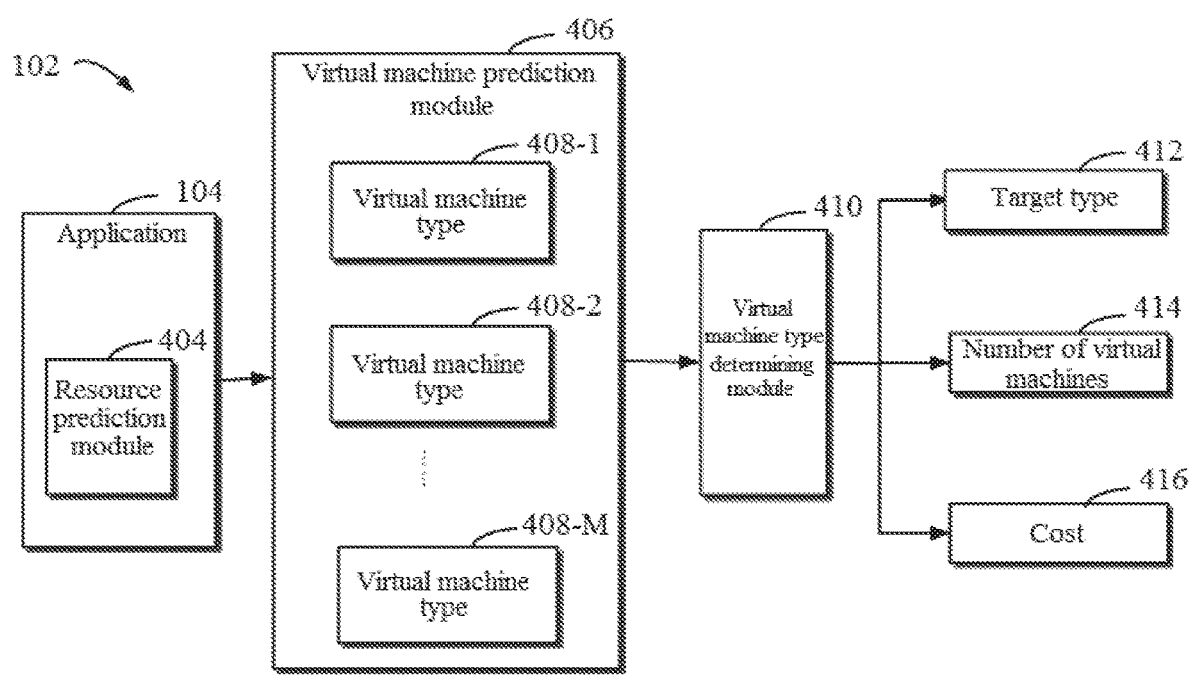
FIG. 4 illustrates a schematic diagram of managing device 102 according to an embodiment of the present disclosure.

A process of determining the cost is described above in combination with FIG. 3, and managing device 102 in FIG. 1 is described below in combination with FIG. 4. FIG. 4 illustrates a schematic diagram of managing device 102 in FIG. 1.

In an embodiment of FIG. 4, managing device 102 includes application 104. Application 104 is provided with resource prediction module 404 corresponding to the application therein. Resource prediction module 404 is configured to predict a target time period in which a load rate of a computing resource exceeds a threshold load rate from a current moment and a computing resource to be used for running application 104 within the target time period. Resource prediction module 404 includes a neural network model. The neural network model is a recurrent neural network model, e.g., a LSTM neural network. Resource prediction module 404 achieves prediction of the target time period and the computing resource through the neural network model.

Managing device 102 further includes a virtual machine prediction module 406. Virtual machine prediction module 406 receives a type of application 104 and the target time period from application 402. An acceptable interruption tolerance of application 104 may be determined based on the type of application 104. Then, virtual machine prediction module 406 determines costs corresponding to a plurality of different virtual machine types 408-1, 408-2, . . . , 408-M based on the interruption tolerance of application 104 and the length of the target time target, where M is a positive integer. Virtual machine prediction module 406 determines the costs for different virtual machine types through the neural network model. For example, for virtual machine type 408-1, an interrupt rate corresponding to virtual machine type 408-1 is predicted based on the length of the target time target, a reference value of the cost which is given in advance, and historical cost data associated with virtual machine type 408-1. If the predicted interrupt rate does not meet the interruption tolerance, the reference value is increased. Then, the interrupt rate is recomputed using the neural network model based on the increased reference value, until a reference value of the cost meeting the interruption tolerance is obtained. Then, the reference value in this case is used as an actual value of the cost. Therefore, actual values of a plurality of costs may be determined for a plurality of virtual machine models.

In some embodiments, virtual machine type determining module 410 determines a target virtual machine type from the plurality of virtual machine types 408 based on the costs acquired from virtual machine prediction module 406. In some embodiments, virtual machine type determining module 410 further acquires a position of a client terminal interacting with application 104 from application 104. Then, virtual machine type determining module 410 determines a group of delays between the client terminal and a virtual machine of each virtual machine type. Then, virtual machine type determining module 410 determines the most appropriate virtual machine type based on the group of delays and the costs. Alternatively or additionally, virtual machine type determining module 410 can determine the number of required virtual machines based on the computing resource and the virtual machine type. Then, a total cost for this type of virtual machines is determined. Finally, an average value for each type is determined based on a harmonic average of each delay and a total cost corresponding to the delay. Then, a virtual machine type with a minimum average value among a plurality of average values is selected as target type 412.

After determining target type 412, target type 412, cost 416 corresponding to target type 412, and number 414 of required virtual machines are sent to a cloud platform for running the determined virtual machine on the cloud platform.

In some embodiments, virtual machine type determining module 410 may further determine number 414 of required virtual machines based on the computing resource predicted by resource prediction module 404 and target type 412.

Figure 5:
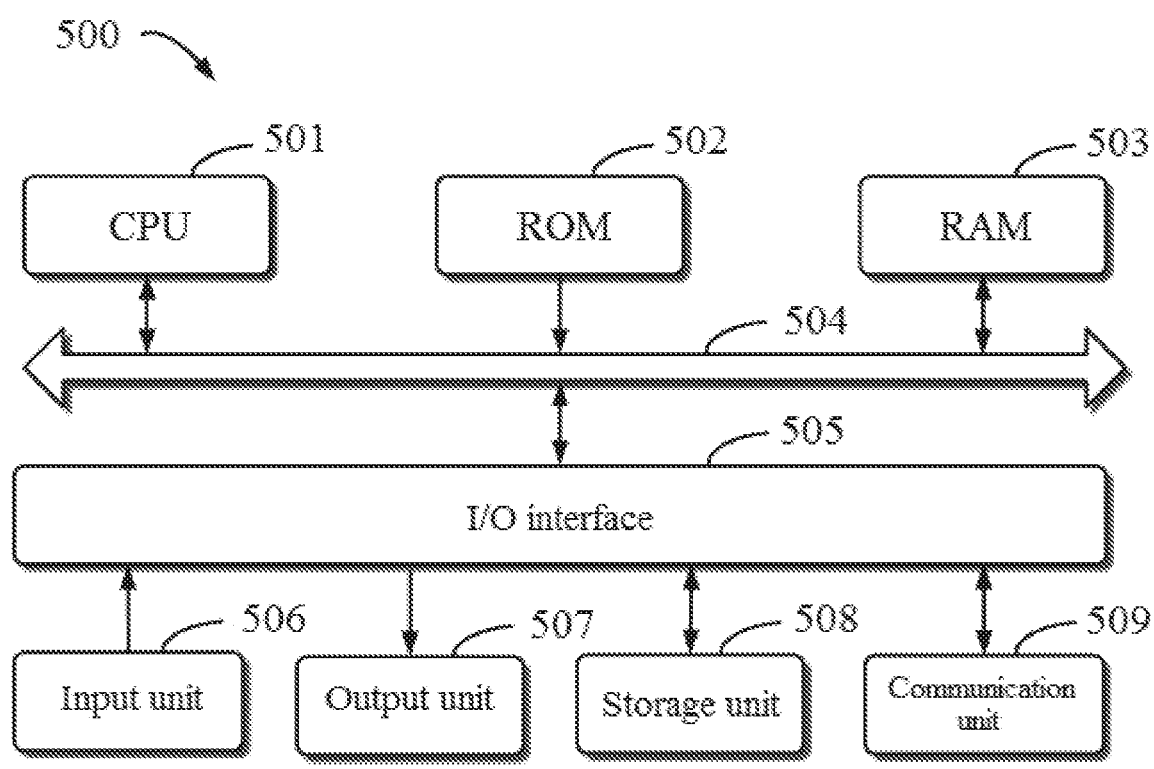
FIG. 5 illustrates a schematic block diagram of example device 500 that is adapted to implement the embodiments of the present disclosure.

FIG. 5 shows a schematic block diagram of example device 500 that may be configured to implement embodiments of the present disclosure. For example, managing device 102 shown in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded onto random access memory (RAM) 503 from storage unit 508. RAM 503 may further store various programs and data required by operations of device 500. CPU 501, ROM 502, and RAM 503 are connected to each other through bus 504. Input/output (I/O) interface 505 is also connected to bus 504.

A plurality of components in device 500 is connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The processes and processing described above, such as method 200 and method 300, may be executed by processing unit 501. For example, in some embodiments, method 200 and method 300 may be embodied as a computer software program that is tangibly included in a machine-readable medium, such as storage unit 508. In some embodiments, some of or all the computer program can be loaded and/or installed onto device 500 via ROM 502 and/or communication unit 509. When the computer program is loaded into RAM 503 and executed by CPU 501, one or more actions of method 200 and method 300 described above may be executed.

The present disclosure may be a method, an apparatus, a system, and/or a computer program product. The computer program product may include a computer-readable storage medium with computer-readable program instructions for executing various aspects of the present disclosure loaded therein.

The computer-readable storage medium may be a tangible device that can retain and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM) or flash memory, a static random access memory (SRAM), a portable compact disk read-only memory (CD-ROM), a digital versatile disk (DVD), a memory stick, a floppy disk, a mechanical encoding device, such as a punch card or an in-groove raised structure with instructions stored thereon, and any suitable combination thereof. The computer-readable storage medium used herein is not construed as transient signals themselves, such as radio waves or other freely propagated electromagnetic waves, electromagnetic waves propagated through waveguides or other transmission media (e.g., optical pulses through fiber-optic cables), or electrical signals transmitted through electrical wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++, and also include conventional procedural programming languages such as the "C" language or similar programming languages. The computer-readable program instructions can be executed entirely on a user computer, partly on a user computer, as a separate software package, partly on a user computer and partly on a remote computer, or entirely on a remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

Various aspects of the present disclosure are described here with reference to the flowcharts and/or block diagrams of the method, apparatus (system), and computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or another programmable data processing apparatus to produce a machine, such that these instructions, when being executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, method, and computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions noted in the blocks may occur in a sequence different from that shown in the figures. For example, any two blocks presented in succession may actually be executed substantially in parallel, or they may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or improvements of the technologies on the market, or to enable other persons of ordinary skills in the art to understand the embodiments disclosed herein.

The invention claimed is:

1. A method for running an application, comprising:
   determining, based on historical data associated with running of the application, a target time period and a computing resource to be used for running the application within the target time period, wherein a resource prediction model determines a portion of a load rate associated with the computing resource exceeds a threshold load rate within the target time period;
   determining an interruption tolerance of the application based on a type of the application;
   determining a cost for running the application by a plurality of types of virtual machines based on a length of the target time period and the interruption tolerance, wherein determining the cost comprises:
      determining a reference value of the cost for running the application by a first type of virtual machine, wherein the first type being one of the plurality of types;
      determining an interrupt rate of the first type of virtual machine based on the length of the target time period and the reference value;
      when the interrupt rate is lower than the interruption tolerance,
         determining that the reference value is an actual value of the cost;
      when the interrupt rate is higher than or equal to the interruption tolerance,
         increasing the reference value by a preset value to update the reference value; and determining the interrupt rate of the first type of virtual machine based on the length of the target time period and the updated reference value; and determining a target type from the plurality of types based at least on the cost and the computing resource, to cause the application to be run by a virtual machine of the target type.

2. The method according to claim 1, wherein determining the target time period and the computing resource comprises:

applying the historical data to the resource prediction model to determine the target time period and the computing resource.

3. The method according to claim 2, wherein the resource prediction model is a recurrent neural network model.

4. The method according to claim 1, wherein determining the interruption tolerance comprises:

acquiring a preset corresponding relationship between the type of the application and the interruption tolerance; and determining the interruption tolerance corresponding to the type of the application based on the corresponding relationship.

5. The method according to claim 1, further comprising: determining a group of delays between the client terminal and the plurality of types of virtual machines, wherein determining the target type further comprises using the group of delays.

6. An electronic device, comprising: a processor; and a memory storing computer program instructions, the processor running the computer program instructions in the memory and controlling the electronic device to perform a method, the method comprising:

determining, based on historical data associated with running of an application, a target time period and a computing resource to be used for running the application within the target time period, wherein a resource prediction model determines a portion of a load rate associated with the computing resource exceeds a threshold load rate within the target time period;

determining an interruption tolerance of the application based on a type of the application;

determining a cost for running the application by a plurality of types of virtual machines based on a length of the target time period and the interruption tolerance, wherein determining the cost comprises:

determining a reference value of the cost for running the application by a first type of virtual machine, wherein the first type being one of the plurality of types;

determining an interrupt rate of the first type of virtual machine based on the length of the target time period and the reference value;

when the interrupt rate is lower than the interruption tolerance, determining that the reference value is an actual value of the cost;

when the interrupt rate is higher than or equal to the interruption tolerance, increasing the reference value by a preset value to update the reference value; and determining the interrupt rate of the first type of virtual machine based on the length of the target time period and the updated reference value; and determining a target type from the plurality of types based at least on the cost and the computing resource, to cause the application to be run by a virtual machine of the target type.

7. The electronic device according to claim 6, wherein determining the target time period and the computing resource comprises:

applying the historical data to the resource prediction model to determine the target time period and the computing resource.

8. The electronic device according to claim 7, wherein the resource prediction model is a recurrent neural network model.

9. The electronic device according to claim 6, wherein determining the interruption tolerance comprises:

acquiring a preset corresponding relationship between the type of the application and the interruption tolerance; and determining the interruption tolerance corresponding to the type of the application based on the corresponding relationship.

10. The electronic device according to claim 6, further comprising:

determining a group of delays between the client terminal and the plurality of types of virtual machines, wherein determining the target type further comprises using the group of delays.

11. A computer program product, the computer program product being tangibly stored in a non-transitory computer-readable medium and comprising machine-executable instructions, the machine-executable instructions, when being executed, causing a machine to perform a method, the method comprising:

determining, based on historical data associated with running of the application, a target time period and a computing resource to be used for running the application within the target time period, wherein a resource prediction model determines a portion of a load rate associated with the computing resource exceeds a threshold load rate within the target time period;

determining an interruption tolerance of the application based on a type of the application;

determining a cost for running the application by a plurality of types of virtual machines based on a length of the target time period and the interruption tolerance, wherein determining the cost comprises:

determining a reference value of the cost for running the application by a first type of virtual machine, wherein the first type being one of the plurality of types;

determining an interrupt rate of the first type of virtual machine based on the length of the target time period and the reference value;

when the interrupt rate is lower than the interruption tolerance, determining that the reference value is an actual value of the cost;

when the interrupt rate is higher than or equal to the interruption tolerance, increasing the reference value by a preset value to update the reference value; and determining the interrupt rate of the first type of virtual machine based on the length of the target time period and the updated reference value; and determining a target type from the plurality of types based at least on the cost and the computing resource, to cause the application to be run by a virtual machine of the target type.

12. The computer program product according to claim 11, wherein determining the target time period and the computing resource comprises:

applying the historical data to the resource prediction model to determine the target time period and the computing resource.

13. The computer program product according to claim 12, wherein the resource prediction model is a recurrent neural network model.

14. The computer program product according to claim 11, wherein determining the interruption tolerance comprises:

acquiring a preset corresponding relationship between the type of the application and the interruption tolerance; and determining the interruption tolerance corresponding to the type of the application based on the corresponding relationship.

* * * * *